(12) United States Patent
ONeill et al.

(10) Patent No.: US 8,676,640 B2
(45) Date of Patent: Mar. 18, 2014

(54) METHOD FOR MANAGING CONTESTS

(71) Applicants: Keith Eric ONeill, Kirkland, WA (US); Brandon James Albers, Everett, WA (US)

(72) Inventors: Keith Eric ONeill, Kirkland, WA (US); Brandon James Albers, Everett, WA (US)

(73) Assignee: L4 Mobile LLC, Seattle, WA (US)

( * ) Notice: Subject to any disclaimer, the term of this patent is extended or adjusted under 35 U.S.C. 154(b) by 0 days.

(21) Appl. No.: 13/851,052

(22) Filed: Mar. 26, 2013

(65) Prior Publication Data

US 2013/0252686 A1    Sep. 26, 2013

Related U.S. Application Data

(60) Provisional application No. 61/615,872, filed on Mar. 26, 2012.

(51) Int. Cl.
*G06Q 30/00*    (2012.01)
*G09F 23/14*    (2006.01)

(52) U.S. Cl.
USPC ............ 705/14.12; 705/14.11; 705/14.14; 705/14.25; 705/14.35; 705/14.36; 705/14.37

(58) Field of Classification Search
USPC .......... 705/14.11, 14.12, 14.14, 14.25, 14.35, 705/14.36, 14.37
See application file for complete search history.

(56) References Cited

U.S. PATENT DOCUMENTS

| | | | |
|---|---|---|---|
| 7,179,167 B2 * | 2/2007 | deKeller | 463/18 |
| 2005/0130728 A1 * | 6/2005 | Nguyen et al. | 463/16 |
| 2007/0055562 A1 * | 3/2007 | Kralik | 705/10 |
| 2008/0139306 A1 * | 6/2008 | Lutnick et al. | 463/30 |
| 2008/0147730 A1 * | 6/2008 | Lee et al. | 707/104.1 |
| 2008/0306826 A1 * | 12/2008 | Kramer et al. | 705/14 |
| 2010/0287011 A1 * | 11/2010 | Muchkaev | 705/7 |
| 2012/0226532 A1 * | 9/2012 | Prabhakar et al. | 705/14.14 |
| 2013/0006735 A1 * | 1/2013 | Koenigsberg et al. | 705/14.12 |

* cited by examiner

*Primary Examiner* — Lawrence Galka
(74) *Attorney, Agent, or Firm* — Steven C. Stewart

(57) ABSTRACT

A service to manage sweepstakes, games, contests, loyalty programs and scavenger hunts is disclosed. The user of an end user device moves to different locations and sends back information regarding the user's location to the service. The service can be updated/adjusted real time to automatically track users, points, entries, location, and multiple step scavenger hunts. The service may send the user to different locations where the user can obtain prizes. Companies can engage with their customers in new ways by leveraging and modifying mobile technology. In one implementation locations, address book, on device animations, randomized unique ID generated by a device during the contest can be modified in real time during operation of the service.

15 Claims, 10 Drawing Sheets

Server Application

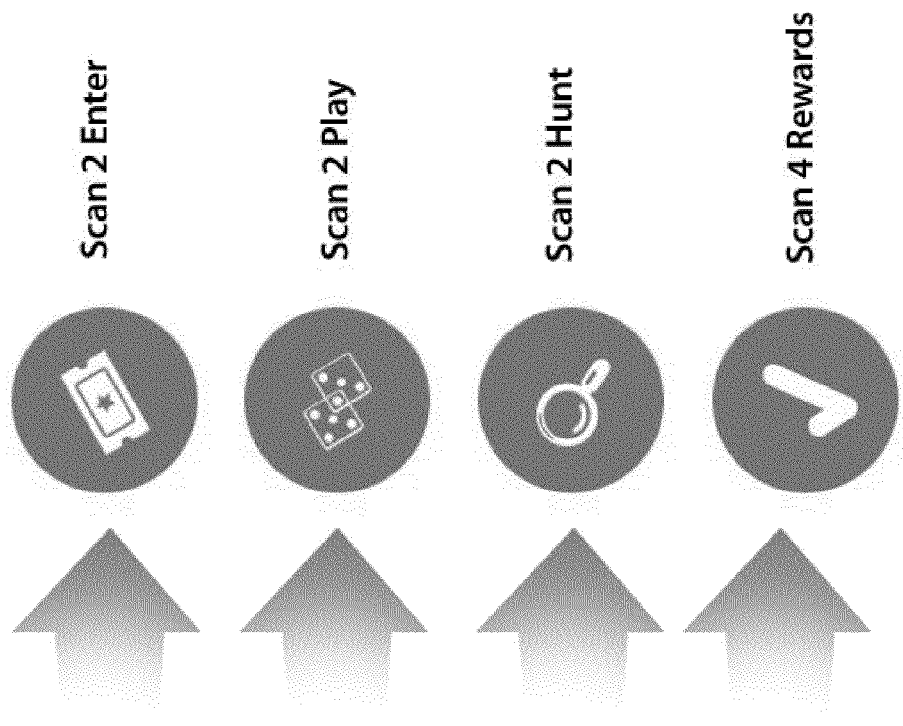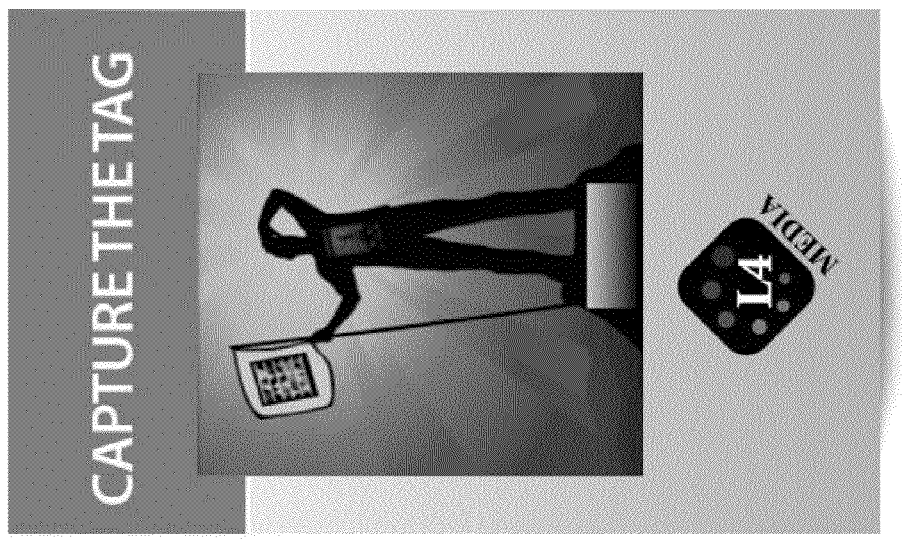
FIG. 6

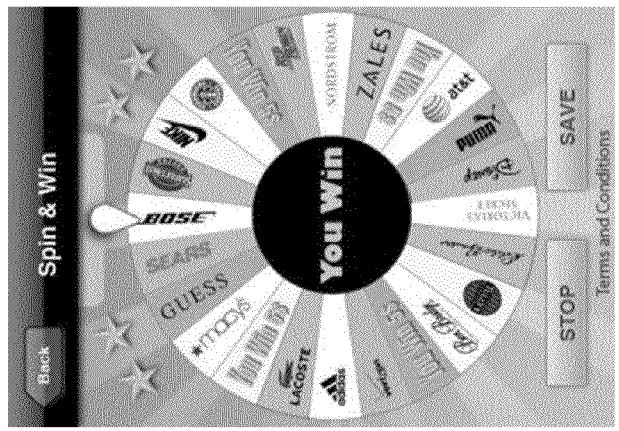
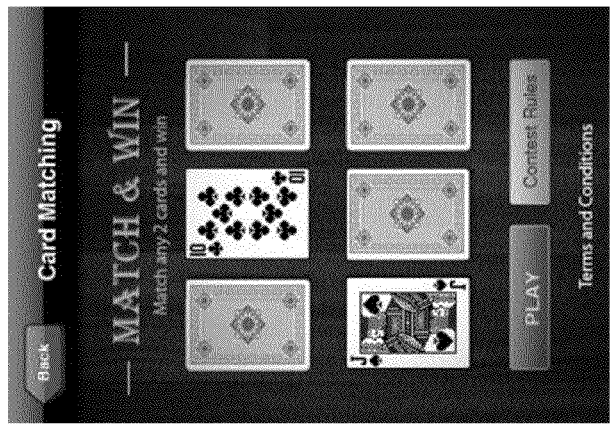
FIG. 7

FIG. 9

METHOD FOR MANAGING CONTESTS

RELATED APPLICATIONS

This application claim the benefit of U.S. provisional application No. 61/615,872 filed on Mar. 26, 2012, the contents of which are hereby incorporated by reference.

TECHNICAL FIELD

These claimed embodiments relate to a method and/or service for managing contests, and more specifically to a service for managing sweepstakes, contests, loyalty programs and scavenger hunts on an end user computing device.

BACKGROUND OF THE INVENTION

In the current age marketing has arrived in which consumers are more informed than ever. Instead of customers willingly being "sold to," consumers are seeking out relationships with the retail companies they choose to do business with. Suddenly, how we live, how we learn, how we communicate and how we buy has all been transformed by the increasing influence of the Internet.

As a result, customers are in control of retailers they deal with by fully expecting to participate in two-way dialogues with those retailers. Consumers are no longer willing to be talked at, they want to be talked with. Consequently, customers are creating powerful brands through innumerable conversations, both online and off, with retailers who they trust. Buying decisions are being made on information, education and influential communities—they are happening as a result of engagement taking place one-on-one between the customer and the retailer.

Thus there is a need for a new interactive service to draw customers to the retailer.

SUMMARY OF THE INVENTION

In one implementation a method for managing a contest service is disclosed. The method includes, but is not limited to, managing a contest with a processing device. The method includes receiving information related to a user of a user computing device via a communications network; determining whether the user has won a game of chance; if user fails to win game of chance, determining whether the user location information indicates a proximity to a predetermined location; sending information to the user computing device via the communication network indicating: an award of a prize in response to the determining that the user has won a game of chance, and additional gaming information in response to the determining that the user location information indicates a proximity to a predetermined location.

In another implementation a method for managing contests with a processing device is disclosed. The method includes, but is not limited to, (a) receiving a request for one of a plurality of tasks for a user of a user computing device via a communications network; (b) receiving user identification information related to the user of the user computing device via the communications network; (c) receiving location information related to a location of the user computing device via the communications network (d) assigning a task of the plurality of tasks to the user based on the received location information; (e) transmitting the assigned task to the user computing device via the communications network; (f) receiving an indication from the user computing device via the communications network of a completion of the assigned task; (g) determining whether or not the user completed the plurality of tasks. In response to determining the user has not completed the plurality of tasks, repeating steps (c)-(g); and (i) in response to determining the user completed the plurality of tasks, sending information to the user computing device via the communication network indicating an award of a prize.

In a further implementation, a non-transitory computer readable media is provided. The non-transitory computer readable media includes instructions which when executed by a processor on a user computing device perform the method that includes, but is not limited to: transmitting location information of the portable computing device and user identification information related to a user of the user computing device to a server computing device via a communications network; executing a game of chance with the portable computing device in which the user selects items in the game; transmitting results of running the game of chance to a server computing device via the communications network; receiving an indication from the server computing device whether the user has won a game of chance; receiving information from the server computing device via the communication network indicating an award of a prize in response to the determining by the server computer that the user has won a game of chance; and receiving gaming information from the server computing device via the communication network indicating additional entries into another game of chance in response to the server computer determining that the user has not won the game of chance and the transmitted location information indicates a proximity to a predetermined location.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 6-7 are exemplary screen displays generated by the application to display or play contests on the user computing device.

FIGS. 8-10 are exemplary screen displays generated by the server when managing contests.

DETAILED DESCRIPTION

Figure 1:
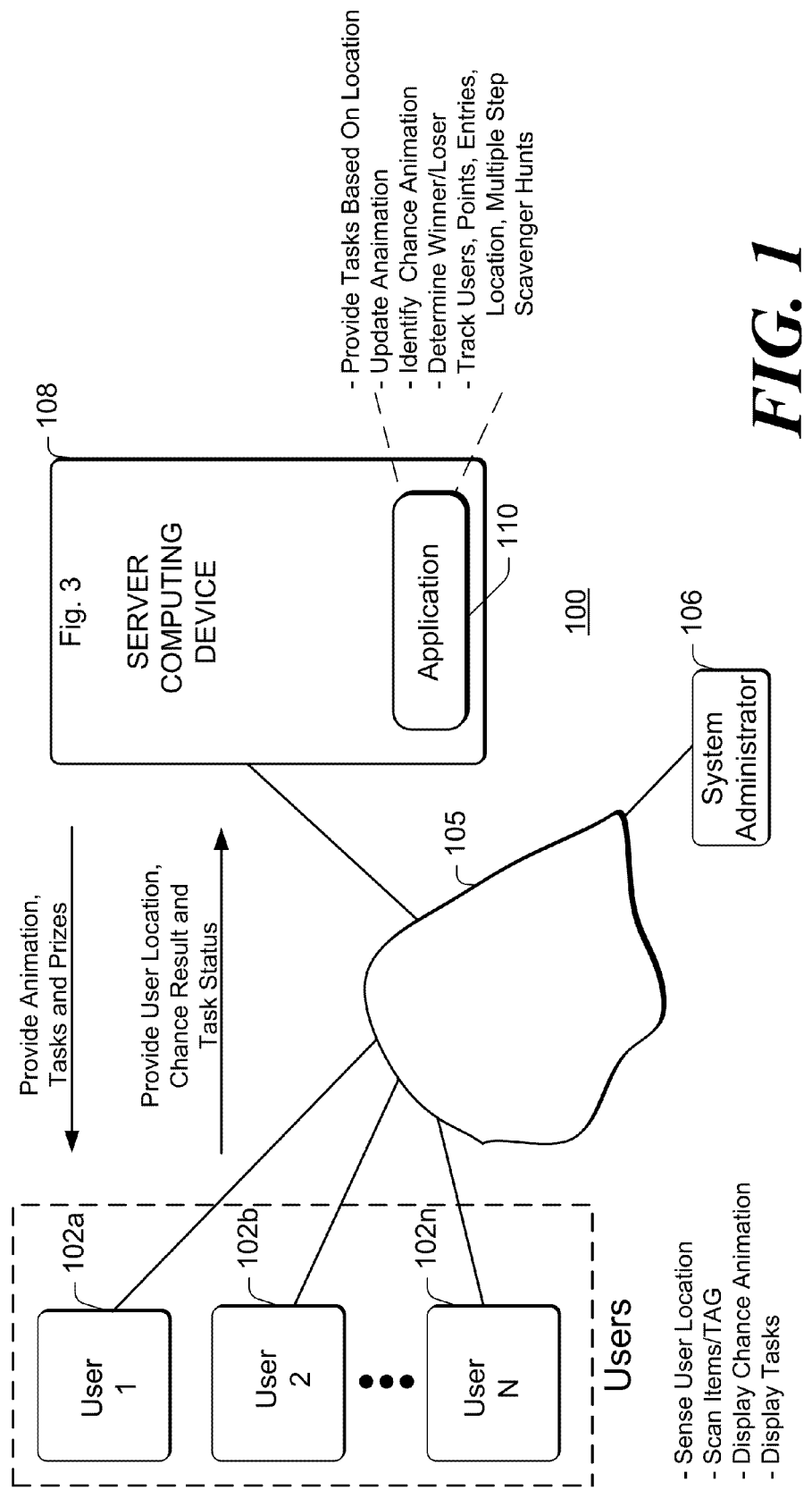
FIG. 1 is a simplified schematic diagram of a system for managing contests.

Referring to FIG. 1 there is shown a system 100 for managing contests on a computing device. Contests include, but are not limited to, sweepstakes, raffles, loyalty programs and scavenger hunts. System 100 includes end user computing devices (also referred to herein as a "customer computing devices") 102*a*-102*n* coupled via a communications network 105 to a system administrator device 106 and to one or more server computing devices 108. Server computing device 108 (also referred to herein as Server 108) communicates directly with end user computing devices 102a-102n and system administrator device 106 via communications network 105; however, such communication is for illustration purposes only and in a typical implementation server computing device 108 communicates via communications network 105 to customer or end user computing devices 102(a-n), other end user computing devices (not shown) and system administrator device 106 (also referred to herein as "system administrator").

Customer computing devices 102a-n represent individual users. All of these customers and their respective identification information will exist and be stored in a data base and can be organized accordingly. A processor running on the customer computing devices 102(a-n), will send a command and customer identification information to server 108 requesting that a contest application be purchased and/or be provided from the server computing device 108. In one implementation, the contest application is served content from a service provider storefront sever, such as Android™ Market or Apple iTunes®. The contest application will then be received and installed on one of computing devices 102(a-n).

Once the contest application is installed, at the request of a user operating one of computing devices 102(a-n), the contest application will be launched. The contest application program will cause the device 102a to obtain the users location, scan or photograph items (such as items to be purchased, or bar codes supplied by a vendor, advertisement material supplied by a vendor or point of sale information) (See FIG. 6), display chance animation of a game to be played (See FIG. 7) launch/run the game of chance, and display a list of one or more tasks to be accomplished by the user of user computing device 102 to receive a reward. The contest application may provide via the communications network indications of the user location, chance game results and/or the status of the user in implementing the one or more tasks to server computing device 108. An exemplary tasks to be performed by a user may include, but is not limited to, the user running a game on user computing device, the user going to a particular web site, the user going to a specific location (e.g. a retail store), or a plurality of locations (multiple stores), the user scanning a TAG or bar-code at one or more specific locations (e.g. posted at a specific retail store or on a product at a specific retail store) and transmitting the scanned TAG/bar code. Retail stores may include a clothing, product, electronics, automotive, hardware or any store that sells products or provides services.

Server computing device 108 may be a network computer, host computer, network server, web server, email server or any computing device for hosting email communications applications and systems, one example of which includes a Microsoft® Windows server. Although end user computing devices 102 and artist computing device are described as a personal computing device, computing devices 102 and artist computing device 106 may be any type of computing device such as a cell phone, laptop, mobile or portable computing device, smart phone, desktop computer, personal computer, PDA (personal device assistant), music player, television, set top box, or game player device.

In one implementation, server computing device 108 includes one or more processors (not shown) and computer memory containing an application 110 for managing contests played by the users of computing devices 102a-102n.

Server computing device 108 includes a software application 110 which when executed by the processors in computing device 108, includes instructions to provide animation, tasks and prizes to user computing devices 102a-102n. Software application 110 also includes instructions to provide tasks to users based on their location, update the contest animation, identify chance animation for the users, and determine winner/losers of the contests. Software application 110 further includes instructions to track the user's locations, user points/score of the contest, user entries, and multiple steps as the user proceeds through the scavenger hunt.

Figure 8:
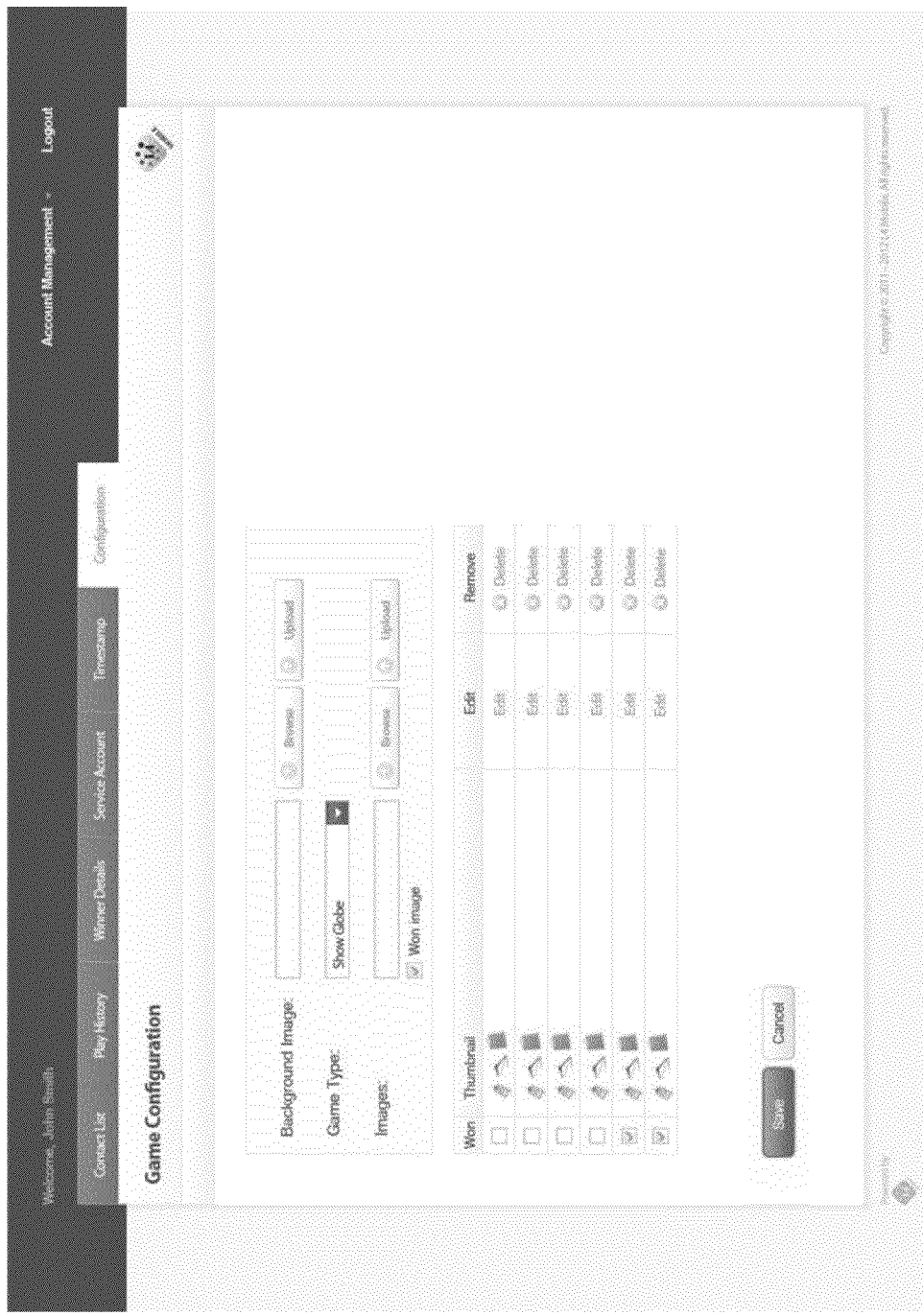
Figure 9:
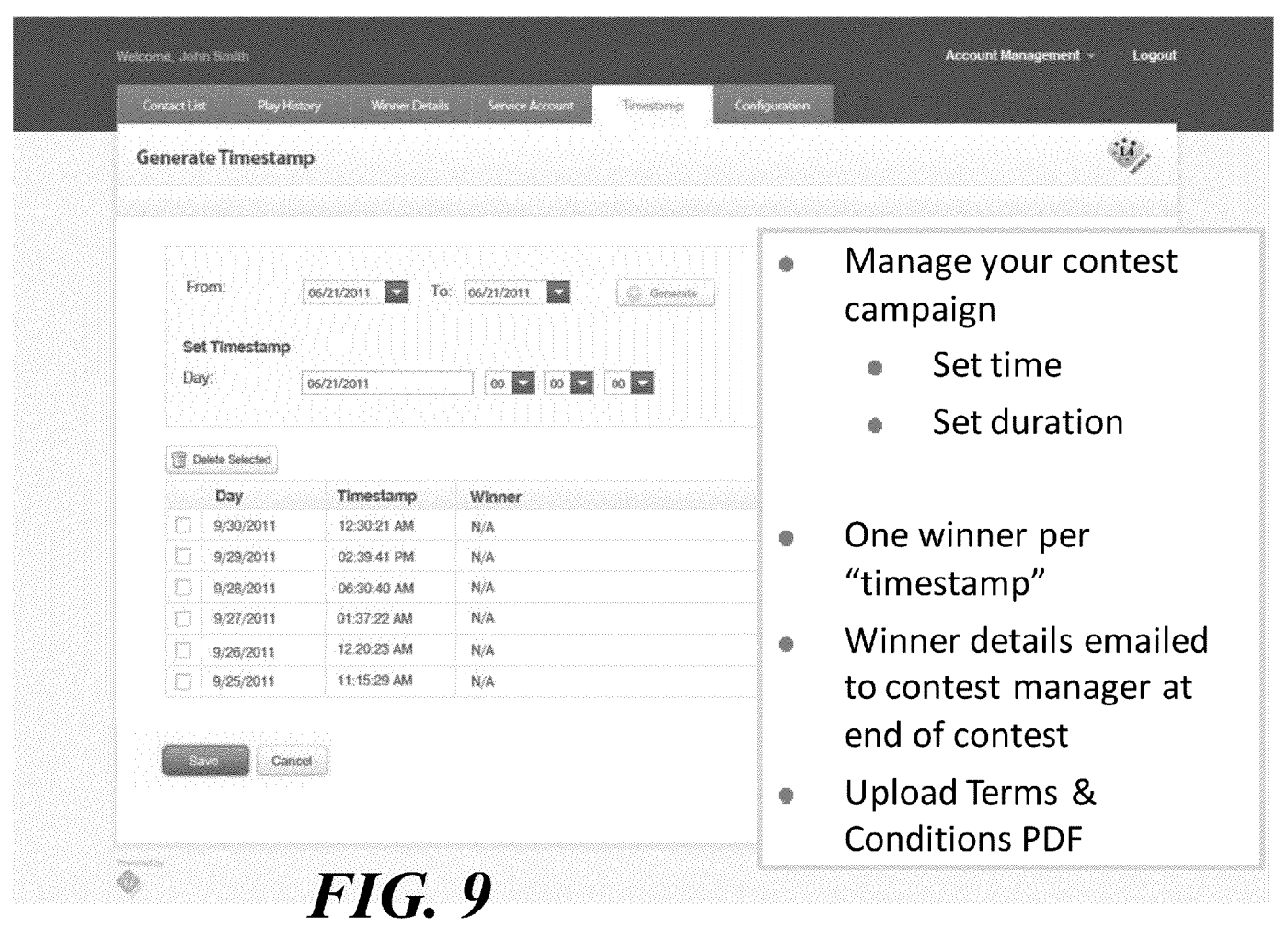
Figure 10:
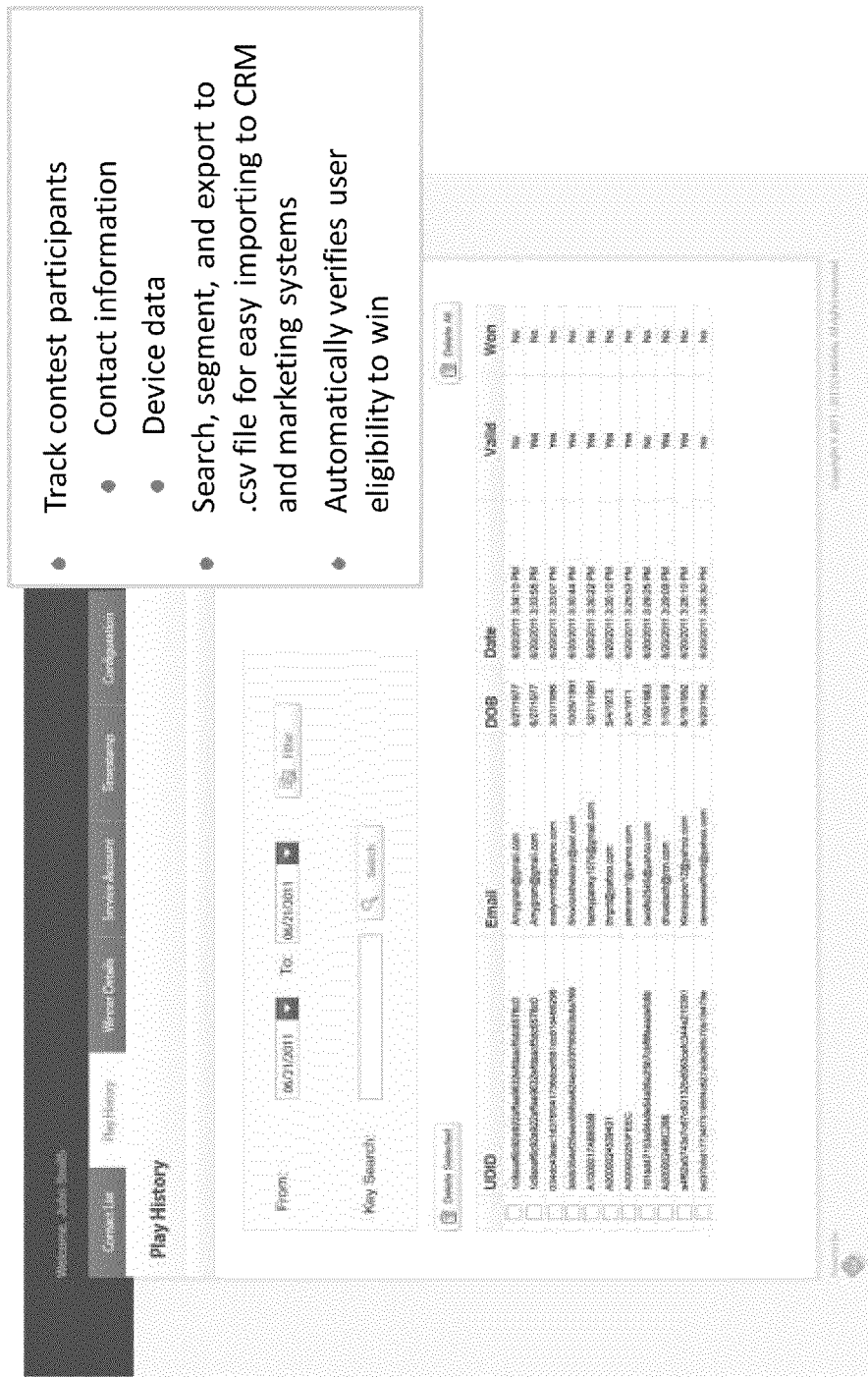

In one implementation, the server computing device includes an application to enable a system administrator 106 to configure the game/contest, manage the game contest and track play history (See FIGS. 8-10).

The system administrator computing device 106 accesses the application 110 on server computing device 108 to configure the game/contest, manage the game contest and track play history.

All user identification and authorization information may be stored within a database in the server computing device 108. Authorizations are identified by username, login name and password and/or a unique identification provided by the user computing device 102a when requesting tasks or prizes. The application in server 108 and controlled by system administrator device 106 formulates the basis of which the contests will be run, and the prize notifications will be distributed to user computing devices 102a-102n.

Further details of this process executed by computing devices 102a-n, system administrator device 106, and server 108 are described in connection with FIGS. 4-5.

Example Personal Computing Device Architecture

Figure 2:
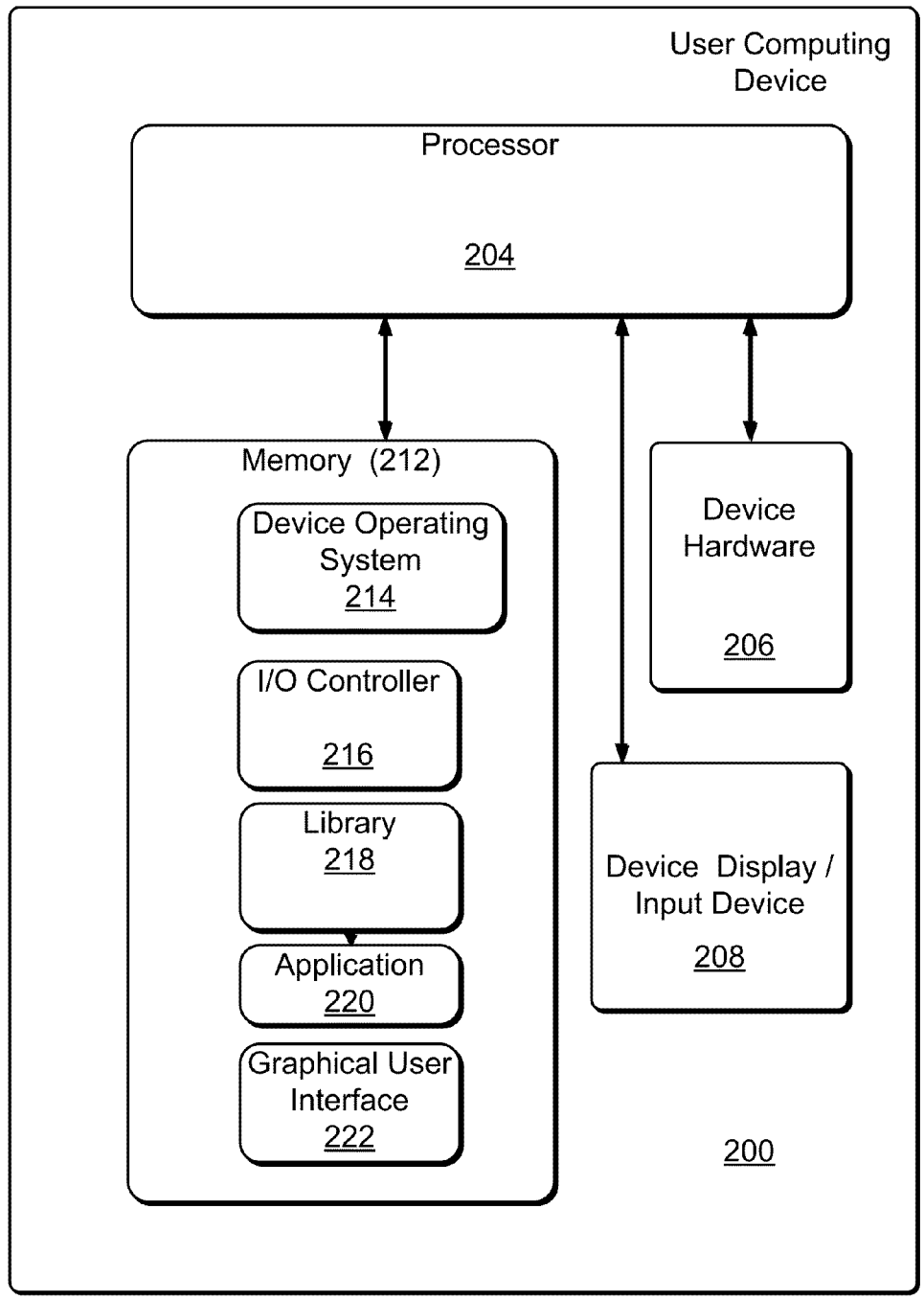
FIG. 2 is a simplified schematic diagram of an exemplary user computing device used in the contest management system.

In FIG. 2 there are illustrated selected modules in system administrator computing device 200 (computing devices 106 of FIG. 1) or Client Computing Device 200 (computing device 102a-b and 105 of FIG. 1). Computing device 200 includes a processing device 204, memory 212, hardware 206 and display/input device 208. Processing device 204 may include a microprocessor, microcontroller or any such device for accessing memory 212, hardware 206 and display/input device 208. Processing device 204 has processing capabilities and memory suitable to store and execute computer-executable instructions. In one example, processing device 204 includes one or more processors.

Processing device 204 executes instructions stored in memory 212, and in response thereto, processes signals from hardware 206 and display/input device 208. Hardware 206 may include network and communication circuitry for communicating with communications network 105 (FIG. 1). Display/Input device 208 receives inputs from a user of the personal computing device and may include a keyboard, mouse, track pad, microphone, audio input device, video input device, or touch screen display. Display device 208 may include an LED, LCD, CRT or any type of display device.

Memory 212 may include a non-transitory volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium (including a non-transitory computer readable storage medium) which can be used to store the desired information and which can be accessed by a computer system.

Modules stored in memory 212 of the personal computing device 200 may include an operating system 214, an I/O controller 216, a library 218, an application 220 and a graphical user interface 222. Operating system 214 may be used by application 220 to operate device 200. I/O controller may provide drivers for device 200 to communicate with hardware 206 or device 208. Library 218 may include preconfigured parameters (or set by the user before or after initial operation) such as personal computing device operating parameters and configurations. Application 220 may include a generally known network browser (including, but not limited to, Internet Explorer, Netscape Firefox, Oracle, Chrome or Safari) for displaying web pages received from the network.

Example Architecture

Figure 3:
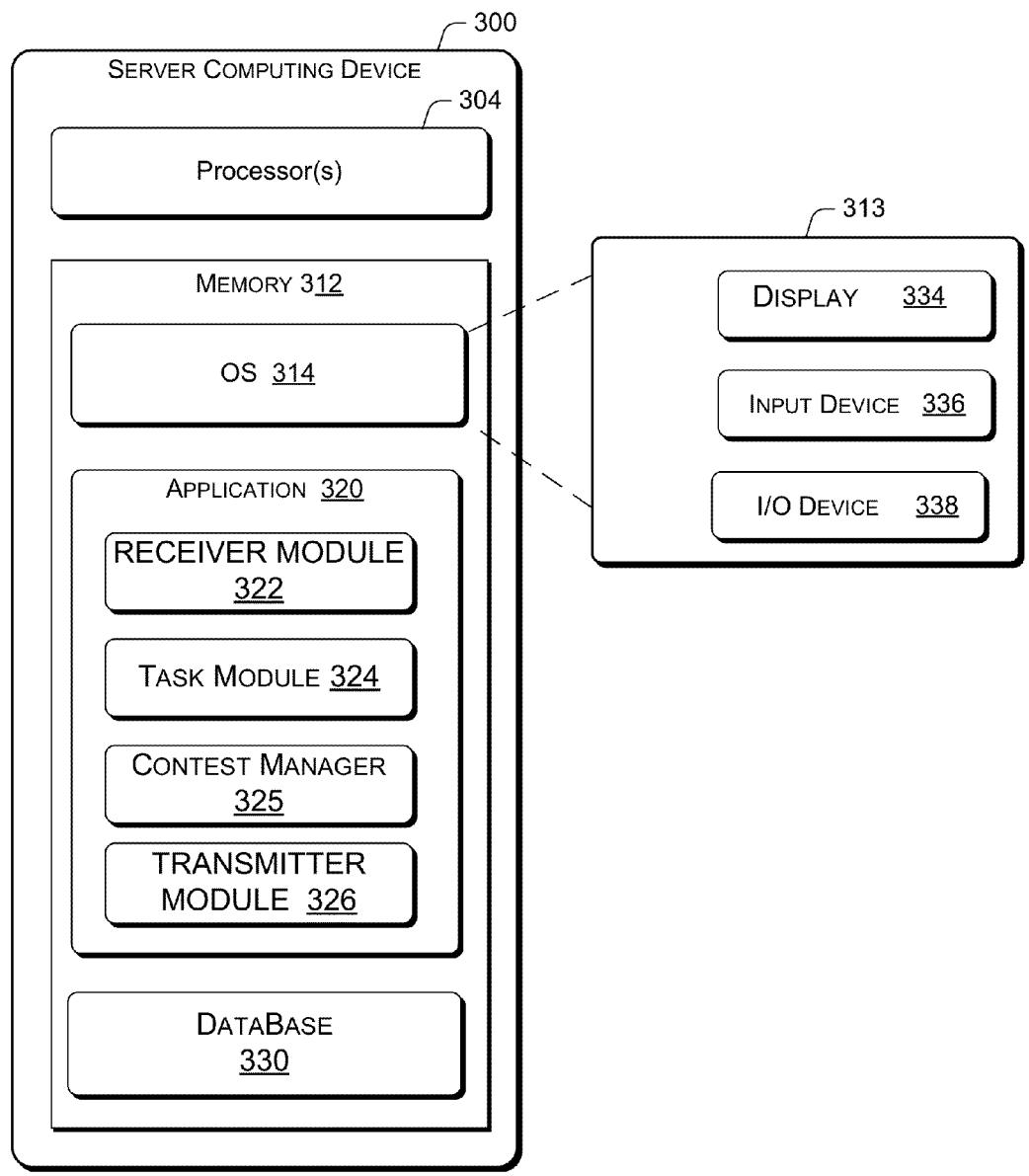
FIG. 3 is a simplified schematic diagram of an exemplary server computing device used in the contest management system.
Figure 4:
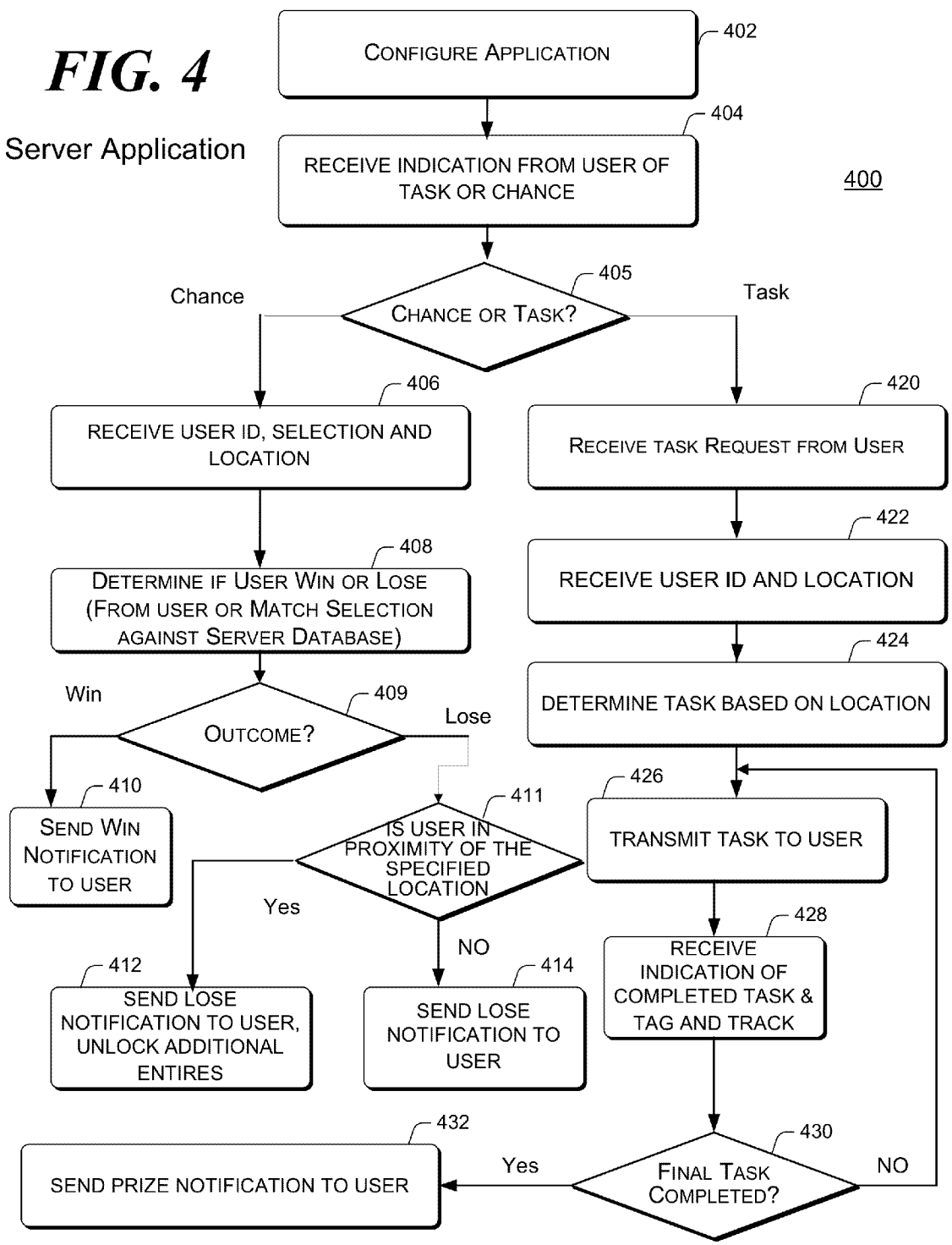
FIG. 4 is a flow chart of a process for the contest management system using the exemplary server computing device shown in FIG. 3.

In FIG. 3 there are illustrated selected modules in a host or server computing device 300 (Server Computing Device 108 of FIG. 1) using processes 400 shown in FIG. 4. Hosting device 300 includes a processing device 304, memory 312, and hardware 313. Processing device 304 may include one or more a microprocessors, microcontrollers or any such devices for accessing memory 312 or hardware 313. Processing device 304 has processing capabilities and memory 312 suitable to store and execute computer-executable instructions.

Processing device 304 executes instruction stored in memory 312, and in response thereto, processes signals from hardware 313. Hardware 313 may include a display 334, and input device 336 and an I/O device 338. I/O device 338 may include a network and communication circuitry for communicating with network 105. Input device 336 receives inputs from a user of the host computing device 300 and may include a keyboard, mouse, track pad, microphone, audio input device, video input device, or touch screen display. Display device 334 may include an LED, LCD, CRT or any type of display device.

Memory 312 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other non-transitory medium which can be used to store the desired information and which can be accessed by a computer system.

Stored in memory 312 of the hosting device 300 may include an operating system 314, application 320 and a library of other applications such as a database 330. Operating system 314 may be used by application 320 to operate device 300. The operating system 314 may include drivers for device 300 to communicate with I/O device 336. Database 330 may include user information, user scores, contest content, video data, audio data and preconfigured parameters (set by the system administrator before or after initial operation) such web site operating parameters, web site libraries, HTML libraries, API's and configurations.

Stored in the database 330 in memory 312 are user preferences, vendor preferences and authorization information. The available preference selections may be embodied as web pages to offer media content.

Application 320 includes a receiver module 322, a task module 324, a contest manager module 325, and a transmitter module 326.

Receiver module 322 includes software instruction stored in a memory, that when executed by processor 304 receive via the network requests from the multiple users for content related to the contests. In addition, instructions in receiver module 322 enable the server 108 to receive the user's locations, results of tasks and of the contests.

Task Manager 324 includes software instruction, that when executed by processor 304, generate the tasks to be performed by the users of computing devices 102a-102n. Such task may be managed and created by the system administrator 106.

Content application module 325 includes software instructions, that when executed by processor 304, stores the results of a contest played by users of computing devices 102a-102n. In one implementation, such results may include indications of codes (including but not limited to Microsoft® TAG codes, 2-dimensional (2D) bar codes, or QR codes) obtained by the user and the results of playing animated games on devices 102a-102n. Content application module may determine prizes for the users of devices 102a-102n.

Transmitter module 326 includes software instructions, that when executed by processor 304 feeds an interface to user computing devices 102a-102n as one or more web pages from memory 312 of the computing device 300. Transmitter module 326, in another implementation, transmits animation, tasks and prizes to the customers/users of computing devices 102a-102n via network 105.

Figure 5:
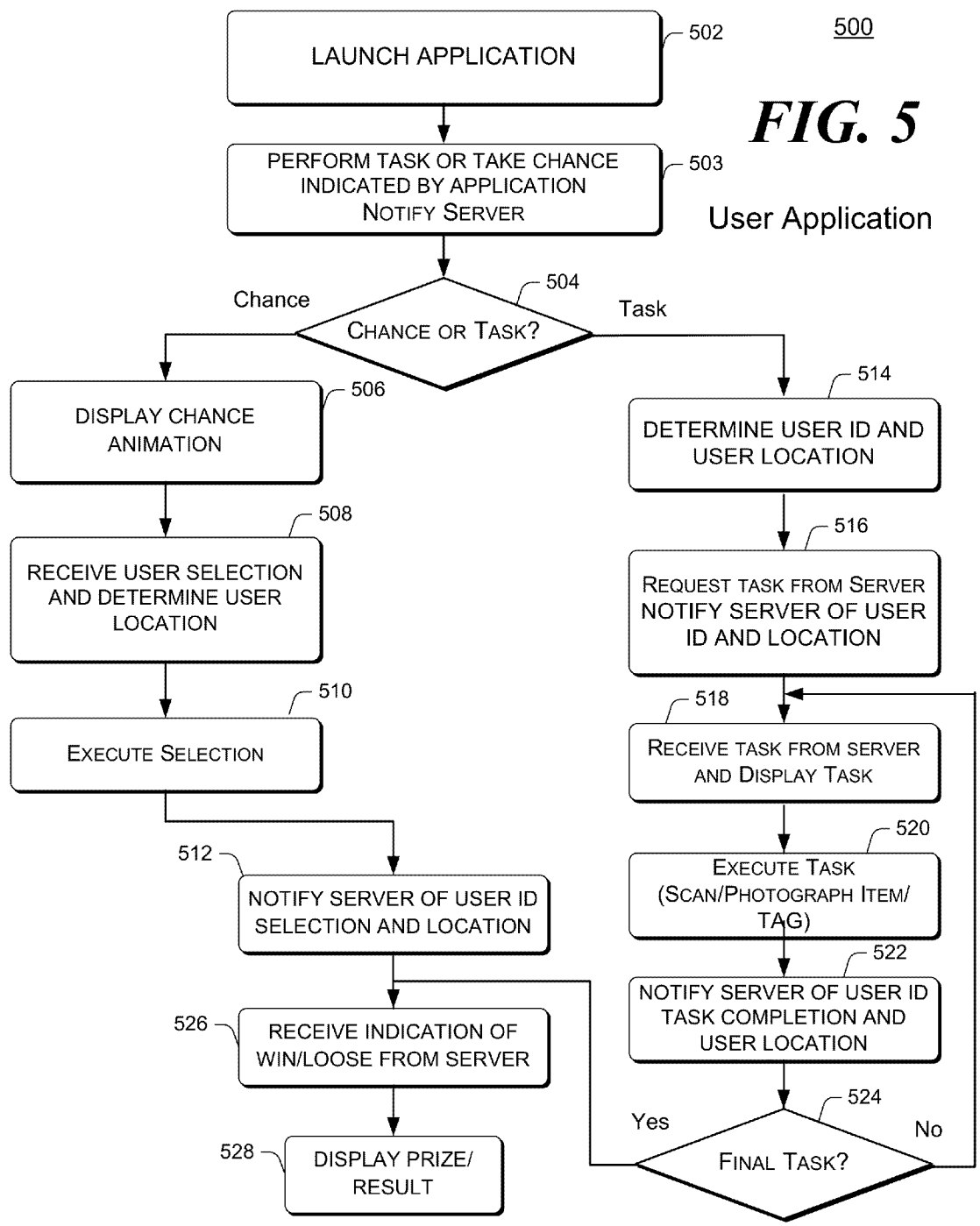
FIG. 5 is a flow chart of a process for the contest management system using the user computing device shown in FIG. 2.

Illustrated in FIGS. 4-5, are processes 400, and 500 for managing contests on the user computing devices 102a-102n. The exemplary process in FIGS. 4 and 5 are illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to FIGS. 4-5, although it may be implemented in other system architectures.

Referring to FIG. 4, a flowchart of process 400 performed by processor 304 on server 300 when executing the software instructions in application 320 stored in a memory is shown. Process 400 includes blocks 402-430. When application 320 is executed on the server computing device 300, it uses the processor 304 and instructions in modules 322-326 that are shown in FIG. 3.

In the process 400, the server computing device 300 (FIG. 3) provides one or more game configuration selections, win configuration selections and participant tracking sheets embedded in web pages (FIGS. 8-10) to system administrator 106, upon request from the system administrator 106 via network 105. Referring to FIG. 9, one web page may provide for setting the time to manage the contest campaign or the duration of the campaign. The web page may allow the system administrator to enter the number of winners, and how the details are sent to the system administrator (also referred to as a contest manager) at the completion of the contest. The web page may provide for how the terms and conditions of the contest are transmitted to the users.

Referring to FIG. 10, in another implementation, the system administrator can track the contest participants, including the participants contact information and device information. The system administrator can search, segment, and export to in any specific file format for importation into a marketing system. The system administrator can configure the play history to automatically verify a user's eligibility to win a prize by comparing the user's information against pre-stored information in a database.

In addition, computing device 300 provides contest winner notifications, tasks and prize notifications to users of computing devices 102a-102n. These contest notifications, may be provided in response to requests from the user computing device 102a-102n and may be received as digital signals that include a user identification code and a web addresses.

In block 402, server computing device 300 configures the application in response to the selections/preferences on web pages (FIGS. 8-10) provided by the system administrator. One such preference may include the maximum duration allowed to complete a task or the time period that the contest is valid, other preference settings determine the appearance and behavior of the game or task.

In block 404, server computing device 300 receives an indication from the user of one of computing devices 102a-102n of a task or a chance. Such indications are generated by the computing device 102a-102n by playing a game or executing a task.

In block 405, the server computing device 300 determines if received indication was a chance or a task. If the request was a chance, server computing device 300 executes blocks 406-414, if it was for a task server computing device 300 executes blocks 420-432.

In block 406, server computing device 300 receives and stores user identification information, user selection information and user location information that is received from one of user computing devices 102(a-n).

In block 408, server computing device 300 determines if the user has won or lost the chance game. Such determination may be made at the user computing device, or by matching a selection obtained from the user device against a server generated random number or by matching the selection against a record in the server database.

In block 409, the server computing device 300 determines whether the outcome of the chance is a winner or a looser. If the outcome in a winner, the server sends a win notification to the user of the winning computing device e.g. device 102a in block 410.

If the outcome was a looser, in block 411, the computing device 300 determines if the user is in proximity of a specified location. The location may be specified by the system administrator when configuring the application in block 402. If the user is in the proximity of the specified location, in block 412, the server sends a lose notification to the user and may unlock one or more of the following: additional entries on the user computing device, additional contests for the user to participate using the users computing device, exclusive content within a mobile application, exclusive content within a website, additional tasks for the user to perform using the user computing device, and additional games or game levels on the users computing device.

If the user is not in proximity of the specified location, device 300 sends a loose notification to the user in block 414.

In block 420, the server computing device 300 receives a task request from the user of one of the computing devices 102a-102n. In block 422, the server computing device 300 receives one of the computing devices 102a-102n user identification and location.

The server computing device 300, in block 424 determines the task to be performed a user of one of the computing devices 102a-102n based on the location of user of the computing device. In one implementation, if the user is at a first location, task A may be provided and if the user is at a second location a different task, e.g. task be may be provided. The task may be selected depending on the location of another user, for example if user A is at location A, then user B may be sent to location A, and if user B is at location A, and user A may be sent to location B. Such location may be at a retail store or retail vendor.

The server computing device 300 in block 426 transmits the determined task to the user, and in block 428 receives an indication when the task is completed. In one implementation, the server computing device 300 receives a code (photograph of a bar code or photograph of the item to be purchased at a retail store) and denotes the received code.

In block 430, the server computing device 300 determines if all the items of the task (or multiple tasks) has been completed for the user. In one implementation is determined by checking the list of completed tasks against a list in the database. If the tasks have been complete (within the specified duration or during the authorized time period), a prize notification indication is provided to a user of one of the user computing devices 102a-102n. In one implementation a notification may be provided to one or more of the computing devices if the specified duration or authorized time period has expired. If the tasks have not been completed, another task is transmitted to the user in block 426. In one implementation, if the task have not been completed, the server computing device receives a user ID and location information in block 422, then the process repeats blocks 424-430.

If the final task is determined to be completed, a prize notification is provided to the user of the user communications device via the communications network in block 432.

Referring to FIG. 5, in block 502, a user of the administrator computing device 106 installs the content tool. The content tool may be provided to the administration computing device 106 from the server computing device 108 or any other source (e.g. loading the software from a computer readable media device). In another implementation, the content tool may be loaded on server computing device and run from a display interface on vendor/artist computing device 106.

In the process 500, the user computing device 200 (FIG. 2) senses the user location, scans items/codes displays chance animation (FIG. 7) and displays task for the user to perform. The computing device also provides user location, chance results and task status via network 105 to server computing device 108. In addition, computing device 200 receives and displays contest winner notifications, tasks and prize notifications to users of computing devices 102a-102n. For exemplary purposes, process 500 will be described using application 220 in computing device 102a, although application 220 may be run using any of computing devices 102a-102n.

In block 502, after receiving an indication from a user of computing device 102a launches the application. In block 503, computing device 102a performs a task or chance game as indicated by the application 220. An indication is transmitted by computing device 102a to server 108 as to whether a task or chance game is being run by the application 220.

In block 502, application 220 determines whether the user has selected a chance or a task. If the selection was a chance, user computing device 102a executes blocks 506-512, if the selection was for a chance user computing device 102a executes blocks 520-530.

In block 506, the user computing device 102a display chance animation.

In block 508, the user computing device 102a receives a user selection and determines (by sensing an internal GPS indication of the computing device 102a) the users location/coordinates.

In block 510, the user computing device 102a executes a user selection by within the chance game. For example the user may select a number, a card other game element.

In block 512, the user computing device 102a notifies the server of the user identification information, the user's selection and the users' location.

In block 514, the user computing device 102a determines the users' identification information. Such information may have been previously entered by the user upon launching the application.

In block 516, the user computing device 102a requests a task from the server, and then notifies the server of the user's identification and location.

In block 518, the user computing device 102a receives the task form the server and displays the task on the display of the computing device 102a.

In block 520, the user executes the task and the computing device 102a receives an indication from the user of the computing device 102a. Such indication may be a scan/photograph, an item or a scan of a TAG (2D bar code or other computer recognizable symbol).

In block 522, the user computing device 102a notifies the server of the user's id, that the task has been completed, and the user location. In one implementation, the server may confirm that the task was complete by comparing the received scan/photograph/tags against a pre-stored image in a database.

In block 524, the user computing device 102a determines if all the tasks have been completed, and that the last task completed was the final task. In one implementation, such determination may be determined by the server computing device 108 that then provides an indication of completion to the user computing device 102a.

If the last task was not the final task, the computing device 102a, in block 518, receives a new task from the server 108 and display the new task.

If the last task was the final task or after notifying the server in block 512, the user computing device 102a in block 526 receives an indication of a win/lose from the server 108. In block 528, the user computing device 102a displays the prize/result to the user.

Examples scans/tags are shown in FIG. 6. Such scans include—scan 2 enter, scan 2 play, scan 2 hung, and scan 4 rewards.

Example of chances games are shown in FIG. 7. Such games of chance include card matching, scratch and win, and spin and win.

Examples of the display use to manage a contest by the administrator are shown in FIG. 8-FIG. 10. The administrator may set (FIG. 9) the time duration for contests, number of winners per time, winning information to be transmitted at the end of the contest, and terms/conditions of the contest to be sent to the end user(s). The administrator may also track (FIG. 10), contestant/end user contact information, user computing device information, user eligibility information and contestant information in .csv format for transmission to a marketing computer system. In one implementation, the downloaded/streamed media content may be displayed while an audio track previously stored on the user/customer computing device 200 is played.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A method for managing a contest with a processing device, the method comprising:
   a) receiving information related to a user associated with a user computing device via a communications network, the information including user location information;
   b) determining whether the user has won a game of chance;
   c) in response to determining that the user failed to win the game of chance, determining whether the user location information indicates a proximity to a predetermined location;
   d) in response to the determining that the user has won a game of chance, sending information to the user computing device via the communication network indicating an award of a prize, and
   e) in response to the determining that the user location information indicates a proximity to the predetermined location, sending at least one of gaming information or a code to unlock gaming information to the user computing device via the communication network, the gaming information including additional game content for the user to play on the users computing device,
   wherein at least steps b) and c) are performed using the processing device.

2. A method for managing a contest, the method comprising:
   receiving information related to a user associated with a user computing device via a communications network, the information related to the user associated with the user computing device received via a communications network includes location information, user identification information, and one or more items selected by a user in a game of chance;
   determining whether the user has won the game of chance;
   if the user fails to win the game of chance, determining whether the user location information indicates a proximity to a predetermined location;
   in response to the determining that the user has won the game of chance, sending information to the user computing device via the communication network indicating an award of a prize; and
   in response to the determining that the user location information indicates a proximity to a predetermined location, sending information to the user computing device via the communication network indicating additional information,
   wherein at least determining whether the user has won and determining that the user location information indicates a proximity to a predetermined location are performed using a processing device.

3. The method as recited in claim 1, wherein the user computing device is a cell phone, laptop, mobile or portable computing device, smart phone, desktop computer, personal computer, PDA (personal device assistant), music player, television, set top box, or game player device.

4. The method as recited in claim 2, wherein determining whether the user has won the game of chance includes matching the user selection against an item in a computer database coupled with the processing device.

5. The method as recited in claim 4, wherein the game of chance is played on the user computing device.

6. The method as recited in claim 1 further comprising providing a lose notification to the user via the user computing device in response to the determining that the user has not won the game of chance.

7. The method as recited in claim 1 wherein sending information to the user computing device via the communication network indicating additional gaming information includes indicating entries into another game of chance to be played on the user computing device.

8. The method as recited in claim 1, wherein sending information to the user computing device via the communication network indicating additional gaming information includes providing codes to unlock other games, or exclusive gaming content within a mobile gaming application or within a website.

9. The method as recited in claim 1, further comprising:
sending to the user computing device via the communications network an assigned task for a user associated with the user computing device to complete in response to the determining that the user location information indicates a proximity to the predetermined location.

10. The method as recited in claim 9, wherein the task includes at least one of: scanning a bar code, scanning a tag, or capturing a photo at one of a plurality of retail stores.

11. A non-transitory computer readable media comprising instructions which when executed by a processor on a user computing device perform the method comprising:
transmitting location information of the portable computing device and user identification information related to a user of the user computing device to a server computing device via a communications network;
executing a game of chance with the portable computing device in which the user selects items in the game;
transmitting results of running the game of chance to a server computing device via the communications network;
receiving an indication from the server computing device whether the user has won a game of chance;
receiving information from the server computing device via the communication network indicating an award of a prize in response to the determining by the server computer that the user has won a game of chance; and
in response to the server computer determining that the user has not won the game of chance and that the transmitted location information indicates a proximity to a predetermined location, receiving gaming information from the server computing device via the communication network indicating codes to unlock:
a) at least one of other games, game content or game levels to be played on the portable communications device,
b) exclusive gaming content within a mobile application, or
c) exclusive gaming content within a website.

12. The non-transitory computer readable media as recited in claim 11, wherein the method further comprises transmitting information related to a selection by a user of items in a game of chance selected using the user computing device to the server computing device via the communications network.

13. The non-transitory computer readable media as recited in claim 12, wherein receiving an indication from the server computing device whether the user has won a game of chance includes receiving an indication of a match of the selection by the user against one or more items in a server computer database.

14. The non-transitory computer readable media as recited in claim 11, wherein the method further comprises receiving a lose notification from the server computing device via the communication network in response to a determination by the server computing device that the user has not won the game of chance.

15. The non-transitory computer readable media as recited in claim 11, wherein the user computing device includes a global positioning system (GPS) detection device for determining a location of the user computing device, and includes a cell phone, laptop, mobile or portable computing device, smart phone, desktop computer, personal computer, PDA (personal device assistant), music player, television, set top box, or game player device.

* * * * *